(12) United States Patent
Rohskopf et al.

(10) Patent No.: US 12,270,610 B2
(45) Date of Patent: Apr. 8, 2025

(54) BAROCALORIC HEAT TRANSFER SYSTEMS AND METHODS OF USE

(71) Applicant: Massachusetts Institute of Technology, Cambridge, MA (US)

(72) Inventors: Andrew Rohskopf, Medford, MA (US); Mehdi Pishahang, Waltham, MA (US); Asegun Henry, Boston, MA (US); Qingzi Zhu, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 303 days.

(21) Appl. No.: 17/710,612

(22) Filed: Mar. 31, 2022

(65) Prior Publication Data
US 2022/0316809 A1    Oct. 6, 2022

Related U.S. Application Data

(60) Provisional application No. 63/170,305, filed on Apr. 2, 2021.

(51) Int. Cl.
*F28D 17/00* (2006.01)
*F28D 17/04* (2006.01)

(52) U.S. Cl.
CPC ........... *F28D 17/005* (2013.01); *F28D 17/04* (2013.01)

(58) Field of Classification Search
CPC ..... F28D 17/005; F28D 17/04; F03G 7/06114
USPC ........................................................ 165/79
See application file for complete search history.

(56) References Cited

U.S. PATENT DOCUMENTS

| | | | |
|---|---|---|---|
| 9,731,218 B2* | 8/2017 | Waite | B01D 5/0054 |
| 10,119,059 B2* | 11/2018 | Cui | F03G 7/0614 |
| 11,454,429 B2* | 9/2022 | Bartholome | F03G 7/0614 |
| 11,596,874 B2* | 3/2023 | Neumann | C02F 1/008 |
| 12,000,663 B2* | 6/2024 | Kitanovski | F28F 13/16 |
| 2022/0186991 A1* | 6/2022 | Yoshimoto | F25B 21/00 |
| 2022/0214091 A1* | 7/2022 | Yoshimoto | F25B 47/02 |
| 2022/0221201 A1* | 7/2022 | Teraki | F25B 21/00 |

(Continued)

OTHER PUBLICATIONS

Aprea et al., The use of barocaloric effect for energy saving in a domestic refrigerator with ethylene-glycol based nanofluids: A numerical analysis and a comparison with a vapor compression cooler. Energy. 2020; 190: 116404.

(Continued)

*Primary Examiner* — Jon T. Schermerhorn, Jr.
(74) *Attorney, Agent, or Firm* — Wolf, Greenfield & Sacks, P.C.

(57) ABSTRACT

Barocaloric heat transfer systems and related methods are generally described. In some embodiments, a heat transfer system may include a barocaloric material which may generate heat upon compression and may cool down upon decompression. The barocaloric material may be pressurized using high pressure and low pressure fluids, which may, in some embodiments, also transfer heat to/from the barocaloric material. The heat transfer system may also include a hot heat exchanger to dissipate heat from the heat transfer system to a first environment and a cold heat exchanger to absorb heat from a second environment, effectively cooling the second environment. In some embodiments, the barocaloric material may be in particulate form.

17 Claims, 9 Drawing Sheets

(56) References Cited

U.S. PATENT DOCUMENTS

2023/0019748 A1* 1/2023 Kawabata .............. F25B 21/00

OTHER PUBLICATIONS

Bom et al., Giant Barocaloric Effects in Natural Rubber: A Relevant Step toward Solid-State Cooling. ACS Macro Lett. Jan. 16, 2018;7(1):31-36. doi: 10.1021/acsmacrolett.7b00744. Epub Dec. 14, 2017. Erratum in: ACS Macro Lett. Apr. 17, 2018;7(4):470-471.
Greco et al., A review of the state of the art of solid-state caloric cooling processes at room-temperature before 2019. Int J Refrig. 2019; 106: 66-88.
Imamura et al., Supergiant barocaloric effects in acetoxy silicone rubber over a wide temperature range: great potential for solid-state cooling. Chinese J Polym Sci 2020; 38: 999-1005.
Moya et al., Caloric materials for cooling and heating. Science. Nov. 13, 2020;370(6518):797-803.
Tušek et al., A regenerative elastocaloric heat pump. Nat Energy. 2016; 1: 16134.

\* cited by examiner

BAROCALORIC HEAT TRANSFER SYSTEMS AND METHODS OF USE

CROSS-REFERENCE TO RELATED APPLICATIONS

This application claims the benefit under 35 U.S.C. § 119(e) of U.S. provisional application Ser. No. 63/170,305, filed Apr. 2, 2021, the disclosure of which is incorporated herein by reference in its entirety.

FIELD

The technology is generally related to heat transfer systems and methods. More specifically, systems and methods using barocaloric heat transfer are disclosed.

BACKGROUND

To address atmospheric ozone depletion within the next century, the use of chlorofluorocarbons (CFCs) refrigerants has been gradually reduced, partially due to the international treaty known as the Montreal Protocol. CFCs have been gradually replaced in favor of hydrochlorofluorocarbons (HCFCs) as a short-term solution and hydrofluorocarbons (HFCs) as a more long-term solution. However, the global warming potential (GWP) of HFCs is greater than 2000 times that of carbon dioxide. Developing nations, which are mostly situated in warm and tropical regions, are experiencing substantially increasing population and economic growth, which will generate a significant demand for cooling. Addressing this demand with HFCs may result in a notable fraction (10-40%) of the planet's global warming potential by 2050.

SUMMARY

In some embodiments, a heat transfer system includes a barocaloric material, a high pressure fluid source, and a low pressure fluid source. The high pressure fluid source is configured to pressurize the barocaloric material to heat a first flow of fluid. The low pressure fluid source is configured to pressurize the barocaloric material to cool a second flow of fluid.

In some embodiments, a method of heat transfer includes exposing a barocaloric material to a first fluid at a first pressure to heat the barocaloric material, transferring heat from the barocaloric material to the first fluid to heat the first fluid to a first temperature, exposing the barocaloric material to a second fluid at a second pressure that is less than the first pressure to cool the barocaloric material, and transferring heat from the second fluid to the barocaloric material to cool the second fluid to a second temperature that is less than the first temperature.

In some embodiments, a heat transfer system includes at least one volume, a barocaloric material disposed in the at least one volume, a high pressure fluid source configured to supply a first fluid at a first pressure, and a low pressure fluid source configured to supply a second fluid at a second pressure lower than the first pressure. The high pressure fluid source is in selective fluid communication with the at least one volume. The low pressure fluid source is in selective fluid communication with the at least one volume. The high pressure fluid source and the low pressure fluid source are configured to alternatingly flow the first fluid and the second fluid through the at least one volume.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
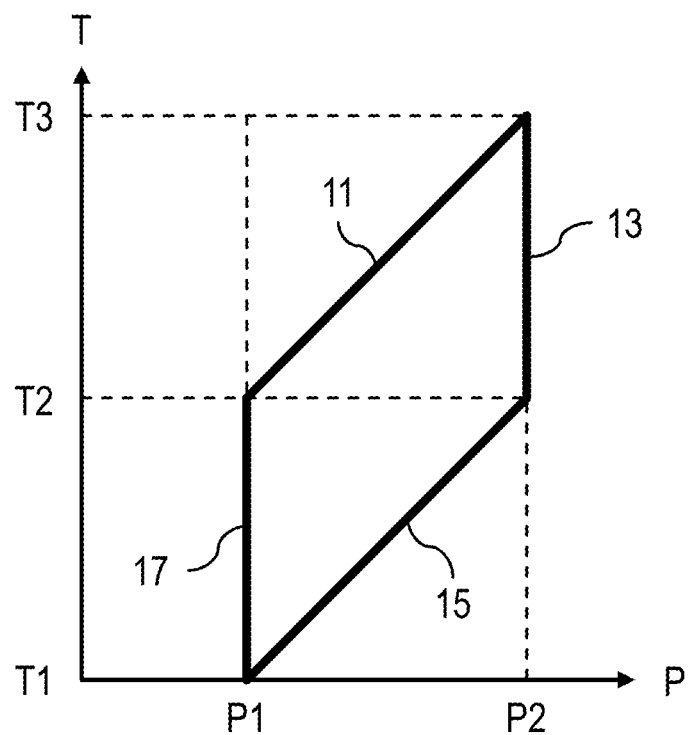
FIG. 1 is a temperature-pressure diagram of one embodiment of a barocaloric heat transfer cycle.

Existing cooling systems make use of greenhouse gases that amplify climate change when released into the environment. Greenhouse gases often absorb solar energy that is reflected off of the Earth's surface as heat and accumulate within the atmosphere. The aggregation of greenhouse gases within the atmosphere effectively insulates the Earth and subsequently contributes to global warming.

Many of the current solutions to address the increasing demand for cooling from developing nations without the use of HFCs and HCFs, both of which have a large global warming potential (GWP), make use of existing vapor compression technologies with alternative fluid refrigerants. However, these solutions either do not offer the efficiencies of HFCs or have associated safety and environmental concerns. For example, ammonia refrigerants are toxic and isobutane refrigerants are both flammable and explosive. Thus, the Inventors have recognized a need for a cooling process that is affordable, energetically efficient, scalable (when compared to existing technologies), non-toxic and/or non-flammable, and which in some instances may have a GWP of less than 1. Such a cooling process may also meet the significant cooling demand without complex and costly infrastructure and without significant danger or harm to the operators and/or surrounding environment. However, instances in which different benefits are offered by the systems and methods disclosed herein are also possible.

In view of the above, the Inventors have recognized the benefits associated with heat transfer processes using barocaloric materials instead of traditional vapor compression technologies. Barocaloric based heat transfer utilizes a pressure based caloric effect, whereby externally applied pressures cause corresponding transitions within the materials which may result in temperature change of the materials. For example, compressing or otherwise pressurizing a barocaloric material may lead to an increase in the material's temperature. Similarly, decompressing or otherwise depressurizing a barocaloric material may lead to a decrease in the material's temperature. Barocaloric cooling may be more efficient than conventional vapor compression techniques due to the low work input associated with compressing solids.

In some embodiments, a heat transfer process may use a solid barocaloric material. During heat transfer, the barocaloric material may first be compressed, which may lead to an increase in its temperature. Then a heat transfer fluid may flow past the barocaloric material and such that the heat transfer fluid absorbs heat from the barocaloric material to transfer heat away from the barocaloric material to a hot heat exchanger, which may subsequently expel the heat to a first environment from the heated heat transfer fluid. The barocaloric material may then be decompressed, which may lead to a decrease in its temperature. A heat transfer fluid, which may either be the same, or a different heat transfer fluid, may then flow past the cooled barocaloric material which may be at a temperature less than the heat transfer fluid such that the barocaloric material absorbs heat from the heat transfer fluid (i.e., cooling the fluid). The heat transfer fluid may subsequently flow to a cold heat exchanger, which may subsequently absorb heat from a second environment into the cooled heat transfer fluid. The process may be cycled repeatedly to transfer heat from the first and second environments. In some instances, heat from the second environment may be transferred to the first environment as part of a heat transfer cycle. Depending on the specific application this process may function as a heat transfer cycle or a cooling cycle as the disclosure is not so limited. In other words, the heat transfer system may be configured to either cool or heat a second environment with respect to the first environment.

It should be appreciated that any appropriate material exhibiting a sufficiently large barocaloric effect for a desired application may be used. Accordingly, the barocaloric material may be any appropriate material that undergoes cooling and/or heating upon the application of a pressure differential to the material. Natural rubber, for example, exhibits significant barocaloric effects due to its compressibility or capacity of its constituent polymer chains to rearrange with a decrease in free volume associated with compression and decompression. Accordingly, appropriate materials may include, but are not limited to, plastic crystals such as natural rubber, acetoxy silicone, neopentylglycol, 2-amino-2-methyl-1,3-propanediol, pentaglycerin, pentaerythritol, tris(hydroxymethyl)aminomethane, 2-methyl-2-nitro-1-propanol, 2-nitro-2-methyl-1,3-propanediol, or any combinations thereof, or any other suitable materials. In some embodiments, the barocaloric material may also be magnetocaloric, such that it may also exhibit barocaloric effects, including $Gd_5Si_2Ge_2$, $(MnNiSi)_{1-x}(FeCoGe)_x$ alloys, La—Fe—Si—Co alloys, shape-memory alloys such as Ni—Mn—In, any combinations thereof, or any other suitable magnetocaloric material which exhibits barocaloric effects. Barocaloric materials may also include electrocaloric materials such as $BaTiO_3$, or other ceramic perovskites, or any other suitable electrocaloric material which exhibits barocaloric effects of a desired magnitude. In some embodiments, the barocaloric material may be a slurry, single-phase, multi-phase, or any other suitable state of matter which undergoes a temperature change in response to a change in pressure. In some embodiments, the barocaloric material may undergo phase changes in response to any suitable physical phenomenon, such that the barocaloric material may be in a first state at a first pressure and in a second state at a second lower pressure. It should be appreciated that the current disclosure is not limited by the barocaloric material used within the heat transfer process.

While the capacity of molecular reconfiguration in certain materials may lead to improved barocaloric effects, it may also lead to poor thermal conductivity. As described previously, barocaloric heat transfer processes may be associated with significant heat transfer to and from a heat transfer fluid. Given the cyclical nature of the heat transfer process, it may be desirable for the barocaloric material to transfer the heat with the associated heat transfer fluid within a desired operational time for the particular process being performed to provide an effective barocaloric heat transfer process.

To improve the effective thermal conductivity of the barocaloric material, it may be desirable to increase a surface area of the material over which heat transfer with the heat transfer fluid may occur. In some embodiments, the barocaloric material may be in particulate form such that a surface area of the particulates may be significantly increased relative to a solid body of the barocaloric material with the same weight as the particulates. However, it should be appreciated that the barocaloric material may be in any suitable form to increase the surface area of the material compared to a solid body. For example, the barocaloric material may be a porous body, which may allow heat transfer fluid(s) to flow through its pores. In some embodiments, increasing the surface area of the barocaloric material may improve the power density of the heat transfer process. In other embodiments, an improvement in the power density of the heat transfer process may result in a smaller footprint for the heat transfer system. Of course, while form factors with increased surface areas (e.g., particles and porous materials), the use of other form factors as well as solid barocaloric materials are also contemplated as the disclosure is not so limited.

In embodiments where the barocaloric material is in particulate form, it should be appreciated that the particles may be uniform or non-uniform in size and/or shape. In other words, the particles may be homogeneous or heterogeneous in size and/or shape as the disclosure is not limited to the size and/or shape of the particles. Accordingly, the particles may be any suitable shape, including, but not limited to spherical, cylindrical, cubic, tetragonal, ellipsoid, or any other suitable shape or combination of shapes. In some embodiments, the particles may be pellet shaped. In other embodiments, the particles may include cavities or any other suitable structural features. For examples, in some embodiments, the particles may have a torus shape. In embodiments where some of the particles may not be spherical, the "size" of the particle may refer to an average maximum transverse dimension (e.g., a maximum length or diameter) of the particle. Accordingly, an average maximum transverse dimension may be greater than or equal to 0.001 mm, 0.01 mm, 0.1 mm, 1 mm, 5 mm, or any other appropriate size. The average maximum transverse dimension of the particles may also be less than or equal to 10 mm, 5 mm, 1 mm, 0.1 mm, and/or any other appropriate size. Combinations of the foregoing ranges are contemplated including, for example, an average maximum transverse dimension that is between or equal to 0.001 mm and 10 mm, 0.01 mm, and 5 mm, and/or any other appropriate size range including ranges both greater than and less than those noted above as the disclosure is not so limited. In embodiments where the barocaloric material is in particulate form, the particles may be packed together in any suitable manner. It should be appreciated that there may be sufficient interstitial space between neighboring particles to avoid excessive pressurization and/or frictional losses of a fluid as it passes through the spaces between the plurality particles.

In some embodiments, a heat transfer fluid(s) may be provided at a suitable pressure to either pressurize or depressurize a barocaloric material in addition to transferring heat between the barocaloric material and the heat transfer fluid. In this way, the heat transfer process and pressurization may occur partially in parallel, which may improve the efficiency of the heat transfer process. In some embodiments, the heat transfer fluid(s) may be pressurized by a pump prior to contacting the barocaloric material, such that the heat transfer system may include a high pressure fluid stream and a low pressure fluid stream, each pressurized by one or more pumps. In embodiments where the barocaloric material is a solid body, the heat transfer fluid(s) may flow around the solid body for pressurization and thermal exchange. In embodiments where the barocaloric material is a particulate or porous body, the heat transfer fluid(s) may flow through the material for pressurization and thermal exchange. In yet another embodiment, barocaloric particles suspended in the heat transfer fluid may flow through the various portions of a system such that the particles undergo compression and expansion in the different high pressure and low pressure portions of a system as the heat transfer fluid and suspended particles cyclically flow through the system. This may permit the implementation of a continuous heat transfer process.

In some embodiments, a barocaloric material may be placed in one or more containers located downstream the pumps used to pressurize the heat transfer fluid(s) to the desired first higher pressure and the second lower pressure used to compress and expand the barocaloric material. The system may include one or more valves that are configured to control the flow of fluid from the high and low pressure sources of the heat transfer fluid to the interior volume of the one or more containers in which the barocaloric material is disposed. In some embodiments, one or more filters may be used to prevent the flow of particles out from the interior volume of the one or more containers. The filter(s) may be any suitable format to sufficiently filter out barocaloric material particles including, for example, a porous sieve, a mesh, a non-woven filter material, a metallic foam, a polymeric filtration membrane, and/or any other appropriate type of filter as the disclosure is not so limited. The filter(s) may include sufficiently large pore sizes to reduce pressurization and/or frictional losses of a fluid passing through the filter(s) while being smaller than a desired minimum size of the particles to prevent flow of the particles through the filter.

The heat transfer fluid(s) used with the various embodiments described herein may be any suitable fluid capable of heat transfer and being pressurized. In some embodiments, the heat transfer fluid is an incompressible liquid which may reduce the work associated with pressurizing and depressurizing the heat transfer fluid. In some embodiments, the heat transfer fluid(s) may be water, which may reduce the cost of operation and may be suitable for widespread use. In some embodiments, the heat transfer fluid(s) may be fluid that are more incompressible than water, including, but not limited to, water-glycol mixtures, glycerin, mercury, phosphate esters, sulfuric acid, or mixtures of such liquids. It should be appreciated that a suitable heat transfer fluid(s) may be selected based on the application and operating parameters of a given heat transfer process. In some applications, the heat transfer process may use a non-polar (e.g., oil-based) heat transfer fluid(s). In some embodiments, the heat transfer system may be used in high temperature applications, and accordingly, the heat transfer fluid(s) may be molten metal, molten salt, molten ceramic (e.g., glass), and/or other high-temperature heat transfer fluids such as diphenyl ether, partially hydrogenated terphenyls, benzyltoluene, non-polar fluids (e.g., oil-based) or other high-temperature fluids capable of fluid flow and heat transfer at the desired elevated operating temperatures of the heat transfer process. It should be appreciated that the heat transfer fluid(s) may have suitable properties (e.g., viscosity, density, vapor pressure, thermal conductivity, etc.) to operate with the heat transfer system. For example, the heat transfer fluid(s) may be selected to minimize the ratio between viscous heat generation (i.e., friction) and the heat transferred from/to the fluid from the barocaloric material. In other words, the fluids and materials of the heat transfer system may be selected to minimize the Brinkman number of the system by minimizing the frictional losses associated with flowing the heat transfer fluid(s) past the barocaloric materials.

In some embodiments, a high pressure fluid used to compress a barocaloric material may be pressurized to a pressure that is at least at 5 MPa, 10 MPa, 20 MPa, 50 MPa, 100 MPa, 200 MPa, 500 MPa, 1 GPa, 2 GPa, or any other suitable pressure. The high pressure fluid may also be pressurized to a pressure that is less than or equal to 2 GPa, 1 GPa, 500 MPa, 200 MPa, 100 MPa, 50 MPa, 20 MPa, 10 MPa, 5 MPa, or any other suitable pressure. Combination of the ranges are contemplated including a high pressure fluid pressurized between 1 MPa and 10 GPa, 10 MPa and 1 GPa, 10 MPa and 100 MPa, 1 MPa and 500 MPa, 5 MPa and 100 MPa, or any other suitable combination. Of course, other ranges, including ranges both greater than and less than those noted above are also contemplated as the present disclosure is not so limited. In view of the above, it should be appreciated that the pressure of the high pressure fluid may be any suitable pressure above the vapor pressure of the high pressure fluid.

In some embodiments, a low pressure fluid used to decompress a barocaloric material may be pressurized to a pressure that is at least at 0.01 MPa, 0.02 MPa, 0.05 MPa, 0.1 MPa, 0.2 MPa, 0.5 MPa, 1 MPa, 2 MPa, or any other suitable pressure. The low pressure fluid may also be pressurized to a pressure that is less than or equal to 2 MPa, 1 MPa, 0.5 MPa, 0.2 MPa, 0.1 MPa, 0.05 MPa, 0.02 MPa, 0.01 MPa, or any other suitable pressure. Combination of the ranges are contemplated including a low pressure fluid pressurized between 0.01 MPa and 10 MPa, 0.01 MPa and 2 MPa, 0.1 MPa and 1 MPa, 0.5 and 1 MPa, 0.1 and 10 MPa, or any other suitable combination. Of course, other ranges, including ranges both greater than and less than those noted above are also contemplated as the present disclosure is not so limited. It should be appreciated that the pressure of the low pressure fluid may be any suitable pressure above the vapor pressure of the high pressure fluid.

It should be appreciated that the barocaloric material may undergo any suitable pressure change to exhibit a desired temperature change for any given application of the heat transfer system. In some embodiments, the pressure differential applied to a barocaloric material to exhibit a desired temperature change may be at least 0.5 MPa, 0.9 MPa, 1 MPa, 2 MPa, 5 MPa, 10 MPa, 20 MPa, 50 MPa, 100 MPa, 200 MPa, 1 GPa, 2 GPa, or any other suitable pressure differential. In some embodiments, the pressure differential may be less than or equal to 0.5 MPa, 0.9 MPa, 1 MPa, 2 MPa, 5 MPa, 10 MPa, 20 MPa, 50 MPa, 100 MPa, 200 MPa, 1 GPa, 2 GPa, or any other suitable pressure differential. Combination of ranges for the pressure differential of the barocaloric material are also contemplated, including between 0.1 MPa and 1 MPa, 0.5 MPa and 10 MPa, 1 MPa and 100 MPa, 1 MPa and 2 GPa, 0.9 MPa, 1.99 GPa, 2 GPa, or any other suitable combination. Of course, other ranges, including ranges both greater than and less than those noted above are also contemplated as the present disclosure is not so limited. It should be appreciated that the barocaloric material may undergo any suitable pressure differential during any portion of the heat transfer cycle, as the present disclosure is not so limited.

It should be appreciated that the heat transfer systems disclosed herein may have any suitable heat transfer capacity. For example, a heat transfer system may be configured to transfer heat between a first environment and a second environment with a power rating that is at least 1 kW, 1.5 kW, 2 kW, 2.5 kW, 3 kW, 3.5 kW, 4 kW, 4.5 kW, 5 kW, 10 kW, or any other suitable heat transfer capacity. The heat transfer capacity of the system may be related to the properties of the heat transfer fluid(s), barocaloric material, overall system construction, and the specific application of the heat transfer system. In some embodiments, the heat transfer system may be used to cool an environment, such as a refrigerator, home, workplace, or other appropriate environment. In other embodiments, the heat transfer system may be used to cryogenically cool an environment. In other embodiments still, the heat transfer system may be used in space flight applications. Of course, while a majority of the embodiments disclosed herein are directed to cooling and environment, instances in which the disclosed heat transfer processes are used for heating and environment and/or transferring heat between two separate flows of heat transfer fluid for a desired use without transferring heat with associated environments are also contemplated as the disclosure is not limited to any specific application of the disclosed systems.

In some embodiments, the barocaloric material may also exhibit other types of caloric effects in addition to the noted barocaloric effect. For example, a barocaloric material may also exhibit magnetocaloric effects. In such an embodiment, a magnetic field may be changed in cooperation with the pressure changes applied to the material to further increase the heating and cooling of the barocaloric material during different portions of the heating cycle. These multi-caloric effects may be used to improve the efficiency of the heat transfer system by increasing the overall caloric effect. In other words, systems in which barocaloric materials are pressurized and magnetized (or exposed to any other suitable external field) during a first portion of a cycle and that are depressurized and demagnetized during a second portion of a cycle are also contemplated. Accordingly, the heat transfer system may include infrastructure to control and operate the multiple caloric effects simultaneously. In some embodiments, the heat transfer system may include both barocaloric materials and magnetocaloric materials (or materials exhibiting any other suitable caloric effects) in combination with one another.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 shows a temperature (T)-pressure (P) diagram of a barocaloric heat transfer cycle according to some embodiments, where T2 is the starting temperature (e.g., 23° C.) and P1 is the starting pressure (e.g., 1 atm). First, the barocaloric material is compressed to a pressure P2 (e.g., 1000 atm), resulting in an increase in temperature from T2 to T3 (e.g., 33° C.), as shown by the simultaneous pressure and temperature increase 11. The material may then be exposed to a cool heat transfer fluid to absorb the heat generated by the barocaloric material as a result of compression, such that the temperature decreases from T3 to T2, as shown by the temperature decrease 13. In some embodiments, the fluid may travel from the hot barocaloric material to a hot heat exchanger, where heat may be dissipated to an environment. This process will be described in further detail below. Next, the barocaloric material may be decompressed such that its pressure changes from P2 back to P1 accompanied by a corresponding decrease in the temperature from T2 to T1 (e.g., 13° C.) during the simultaneous pressure and temperature decrease at 15. At this stage, a hot heat transfer fluid may flow by the cooled barocaloric material to transfer heat from the fluid to the barocaloric material. As the barocaloric material absorbs heat from the fluid, the temperature of the barocaloric material may increase from T1 to T2, as shown by the temperature increase 17. In some embodiments, the cooled fluid may travel to a cold heat exchanger to absorb heat from an environment, as will be described in further detail below. The heat transfer cycle may then be repeated when the barocaloric material is once again compressed or otherwise pressurized to P2, as shown by simultaneous pressure and temperature increase 11.

While specific temperature and pressure ranges are noted above, it should be understood that any appropriate pressure and temperature change between the different portions of the heat transfer cycle may be used as the disclosure is not limited in this fashion. For example, the temperature range between T1 and T3 (i.e., the minimum and maximum temperature of the barocaloric material during the cycle), or the operation temperature range of the heat transfer system, may be any suitable range depending on the desired application. In some embodiments, the temperature difference between T1 and T3 may be greater than or equal to 2° C., 5° C., 10° C., 20° C., 30° C., 40° C., 50° C., 60° C., 70° C., 80° C., 90° C., 100° C., 120° C., 140° C., 160° C., 180° C., 200° C., 250° C., 300° C., or any other suitable range. Correspondingly, the temperature difference may be less than or equal to 400° C., 350° C., 300° C., 250° C., 200° C., 180° C., 160° C., 140° C., 120° C., 100° C., and/or any other appropriate range. Combinations of the foregoing are contemplated including, for example, a temperature difference that is between or equal to 10° C. and 400° C. However, any appropriate range of temperatures including temperature differences both greater than and less than those noted above are also contemplated as the present disclosure is not limited by the temperature range of the heat transfer system. Additionally, it should be appreciated that while the intermediate temperature T2 may be ambient temperature in some embodiments, in other embodiments, the intermediate temperature T2 may be any suitable temperature including temperatures either greater than or less than ambient temperature as the present disclosure is not so limited.

In some embodiments, the barocaloric material may experience any suitable temperature change in response to an applied corresponding pressure change as noted above. In some embodiments the temperature differential between T2 and T3 and/or between T4 and T1 may be determined at least in part on the material properties and corresponding pressure differential between these operating points Accordingly, in some embodiments, a temperature change of a barocaloric when a corresponding pressure differential as disclosed herein is applied (either increasing or decreasing) may be greater than or equal to 2° C., 5° C., 10° C., 20° C., 30° C., 40° C., 50° C., 60° C., 70° C., 80° C., 90° C., 100° C., 120° C., 140° C., 160° C., 180° C., 200° C., 250° C., 300° C., or any other suitable range. Correspondingly, the temperature change resulting from an applied pressure change may be less than or equal to 400° C., 350° C., 300° C., 250° C., 200° C., 180° C., 160° C., 140° C., 120° C., 100° C., and/or any other appropriate range. Combinations of the foregoing are contemplated including, for example, a temperature change that is between or equal to 2° C. and 400° C. However, any appropriate range of temperatures including temperature differences both greater than and less than those noted above are also contemplated as the present disclosure is not limited by the temperature range of the heat transfer system.

Figure 2:
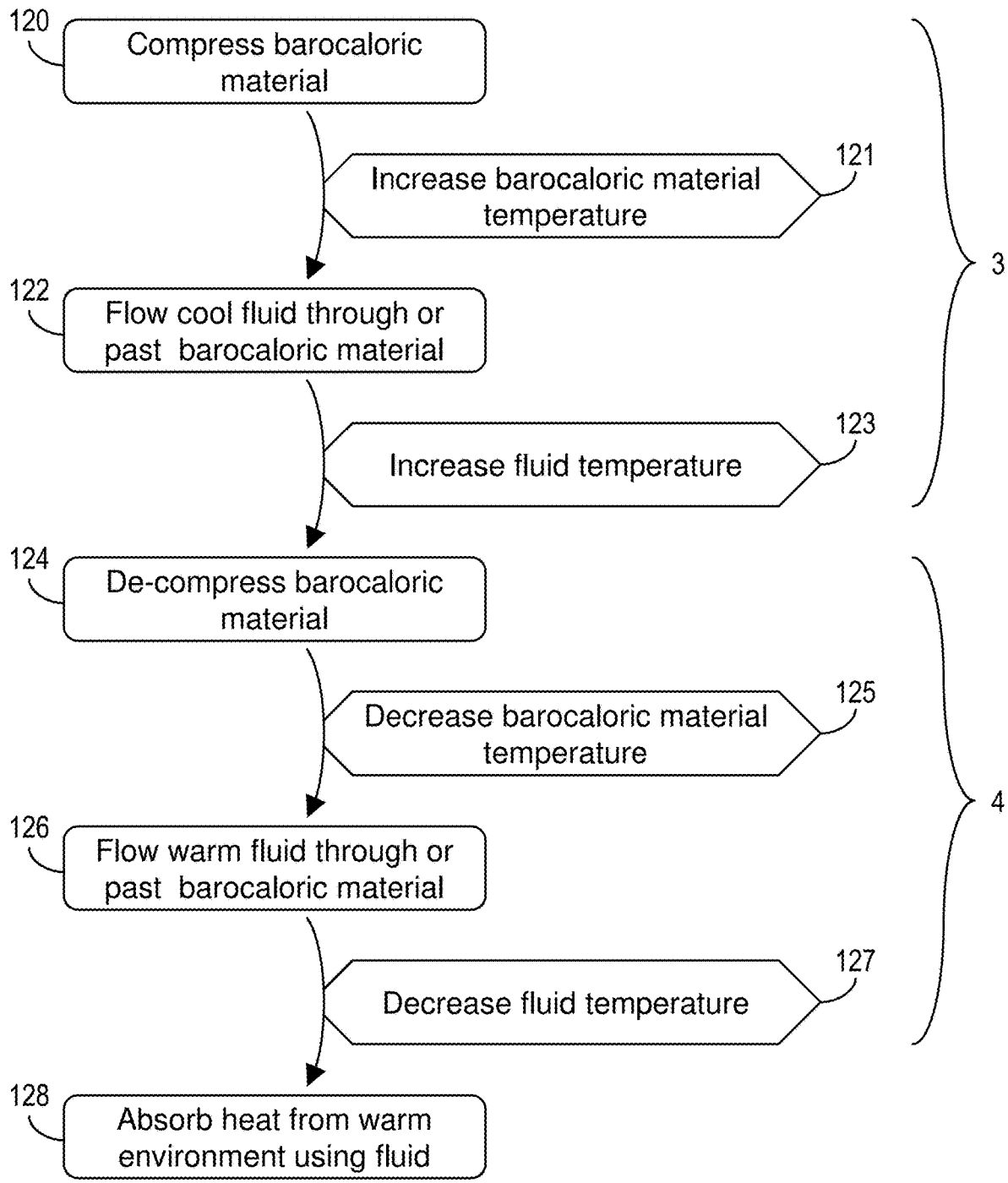
FIG. 2 is a flow chart of another embodiment of a barocaloric heat transfer cycle.

FIG. 2 shows a flow chart for one embodiment of a barocaloric heat transfer cycle. First, a barocaloric material, which may be in bulk or particulate form, may be compressed, as shown in block 120, which may lead to an increase in temperature of the barocaloric material, shown in block 121. Next, a fluid at a temperature below the increased temperature of the barocaloric material of block 121 may flow through or past the heated barocaloric material such that it comes into thermal contact with the barocaloric material, as shown in block 122. Based on the heat transfer properties of the fluid and the barocaloric material, the fluid may consequently be heated (i.e., the fluid may absorb the generated heat of the barocaloric material), as shown in block 123. In some embodiments, the heat transfer fluid of block 122 may also apply a pressure to compress the barocaloric material as referenced previously in block 120. The barocaloric material may then be decompressed, or otherwise depressurized to a lower pressure than that at block 120, as shown in block 124. This decrease in pressure may result in a corresponding decrease in the barocaloric material temperature, as shown in block 125 and as described previously. Next, a fluid at a temperature above the temperature of the cooled barocaloric material of block 125 may be brought into thermal contact with the cooled barocaloric material of 124 by either flowing the fluid through or past the barocaloric material, as shown in block 126. Depending on the embodiment, this fluid may either be the same, or a separate flow of fluid, as the flow of fluid used to cool the barocaloric material noted above. In either case, the barocaloric material, which may be at a lower temperature than the fluid, may then absorb heat from the fluid, which may result in a decrease of the fluid temperature, as shown in block 127. As shown in FIG. 1, the barocaloric material's temperature increases as a result of absorbing heat from the fluid, which may subsequently return the barocaloric material temperature to that of block 120. In some embodiments, the cooled fluid of block 127 is then transported to a warmer environment (e.g., a warm living space) to absorb heat from the environment, as shown in block 128. In some embodiments, the fluid of block 126 may also act as the lower pressure source used to decompress the barocaloric material, shown in block 124. In other words, the noted flows of heat transfer fluid may be used as separate high and/or low pressure sources to both compress and decompress the barocaloric material as well as transport heat away and to the barocaloric material. The cycle shown in FIG. 2 may be repeated in a cyclical fashion to provide an overall heat transfer cycle. Further, a cycle time of the heat transfer cycle may be a sufficiently short period of time to maintain a desired environment.

When discussing the overall heat transfer cycle described relative to FIG. 2, the heat transfer cycle may be referred to as including a hot stage 3, in which the barocaloric material may be compressed to increase a temperature of the barocaloric material to a first maximum temperature during the heat transfer cycle, and a cold stage 4, in which the barocaloric material may be decompressed to decrease the temperature of the barocaloric material to a second minimum temperature of the barocaloric material during the heat transfer cycle which may be less than both the maximum temperature of the barocaloric material and an intermediate starting temperature of the barocaloric material at block 120 (also see temperature T2 of FIG. 1).

Figure 3:
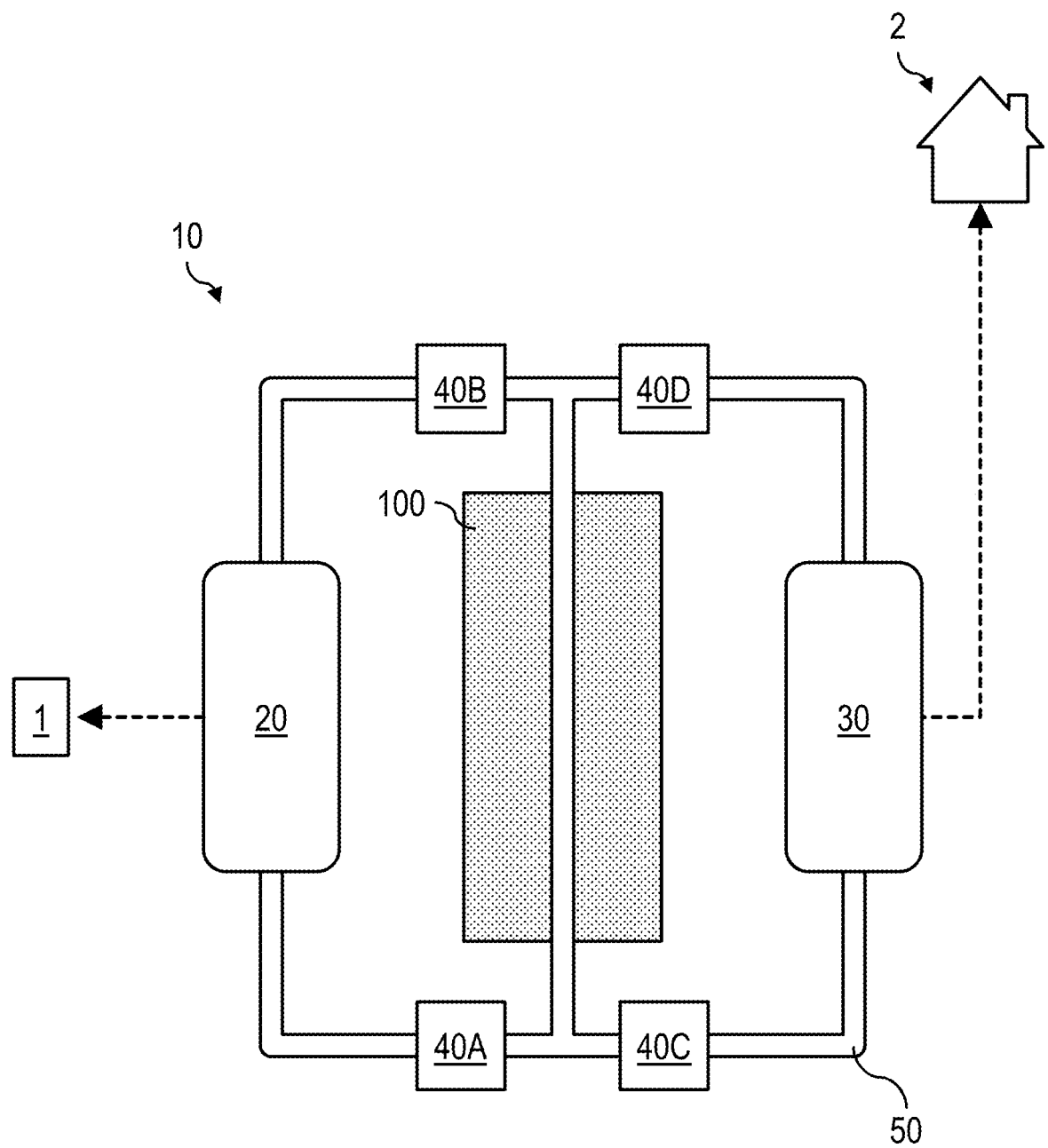
FIG. 3 is a schematic of one embodiment of a barocaloric heat transfer system.

FIG. 3 shows a schematic view of a heat transfer system according to some embodiments. In these embodiments, environment 1 and environment 2 are at the same initial temperature, and the heat transfer system may operate to decrease the temperature of environment 2 relative to environment 1. The heat transfer system 10 includes barocaloric material 100, a hot heat exchanger 20, a cold heat exchanger 30, valves 40A-40D, and fluid connections 50, such as pipes, tubes, or other appropriate connections to connect the aforementioned components. In some embodiments, the barocaloric material 100 may be a solid body, whereas in other embodiments, the barocaloric material 100 may be in particulate form. In either case, the barocaloric material may be disposed within the interior of a vessel through which the fluid may flow through or past the barocaloric material. However, embodiments in which heat transfer fluid flowing through the system does not directly contact the barocaloric material and is instead indirectly thermally connected with the barocaloric material are also contemplated.

In operation, the barocaloric material 100 may be compressed at a first stage of the heat transfer cycle (hot stage 3, see FIG. 2). In some embodiments, the compression of the barocaloric material 100 may be due to flow of a high pressure fluid from a high pressure source, detailed further below, past or through the barocaloric material. In these embodiments, valves 40A and 40B (with valves 40C and 40D closed) may be opened to permit the flow of the high pressure fluid at a first temperature through this portion of the fluid circuit to pressurize and absorb generated heat from the barocaloric material. As described previously, compression of the barocaloric material results in an increase in temperature. Fluid flowing from valve 40A through the barocaloric material to valve 40B may be at a lower temperature than fluid flowing through valve 40B as the fluid absorbs heat from the heated barocaloric material. The fluid may then flow from valve 40B to a hot heat exchanger 20 to transfer or dissipate heat to the environment 1. Over time, the barocaloric material 100 may equilibrate towards a temperature of the incoming high pressure fluid (i.e., the fluid at valve 40A, which may be at the intermediate temperature described previously), such that the barocaloric material 100 cools down. The barocaloric material 100 may then be decompressed, which may result in a decrease in temperature of the barocaloric material to a temperature that is below the intermediate temperature. In some embodiments, the decompression of the barocaloric material 100 may be due to flow of a low pressure fluid past the barocaloric material. In these embodiments, the low pressure fluid may flow from a low pressure source detailed further below through valve 40C and through the volume including the barocaloric material to valve 40D (with valves 40A and 40B closed). Similar to the above, this may result in both the decompression of the barocaloric material 100 and the transfer of heat from the fluid to the barocaloric material to heat the barocaloric material. Accordingly, fluid at valve 40C may be at a higher temperature than fluid at valve 40D as the fluid transfers heat to the barocaloric material. The cooled fluid may then flow from valve 40D to a cold heat exchanger 30 to absorb heat from the environment 2. It should be appreciated that passing warm fluid past the cold barocaloric material may increase the temperature of the barocaloric material 100. The heat transfer cycle may be repeated in a manner similar to those described in FIGS. 1-2 by cyclically opening and closing the sets of valves described above to cyclically heat and cool the barocaloric material while transferring heat between the two environments. However, while a heat transfer cycle has been illustrated in the current embodiment, the current systems and processes are not limited to heat transfer cycles as noted previously.

It should be appreciated that in some embodiments, the high pressure and low pressure heat transfer fluids may be separate flows as shown by the separate valves and fluid connections 50 in FIG. 3. However, in other embodiments, the same stream of fluid may function as both the high pressure and low pressure heat transfer fluid through the use of appropriate flow restrictions, pressure sources, and fluid connections.

Figure 4A:
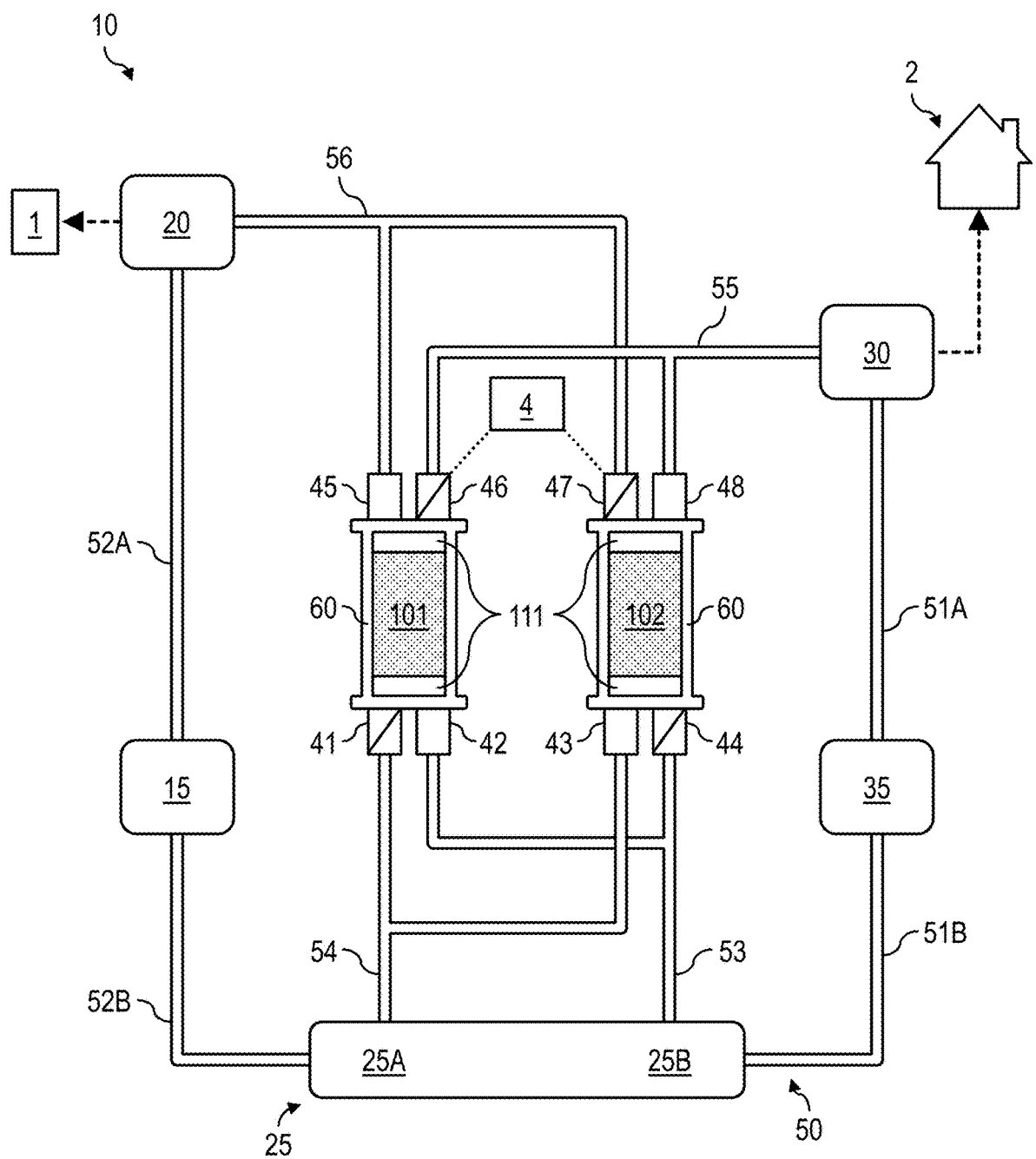
FIG. 4A is a schematic of another embodiment of a barocaloric heat transfer system.
Figure 4B:
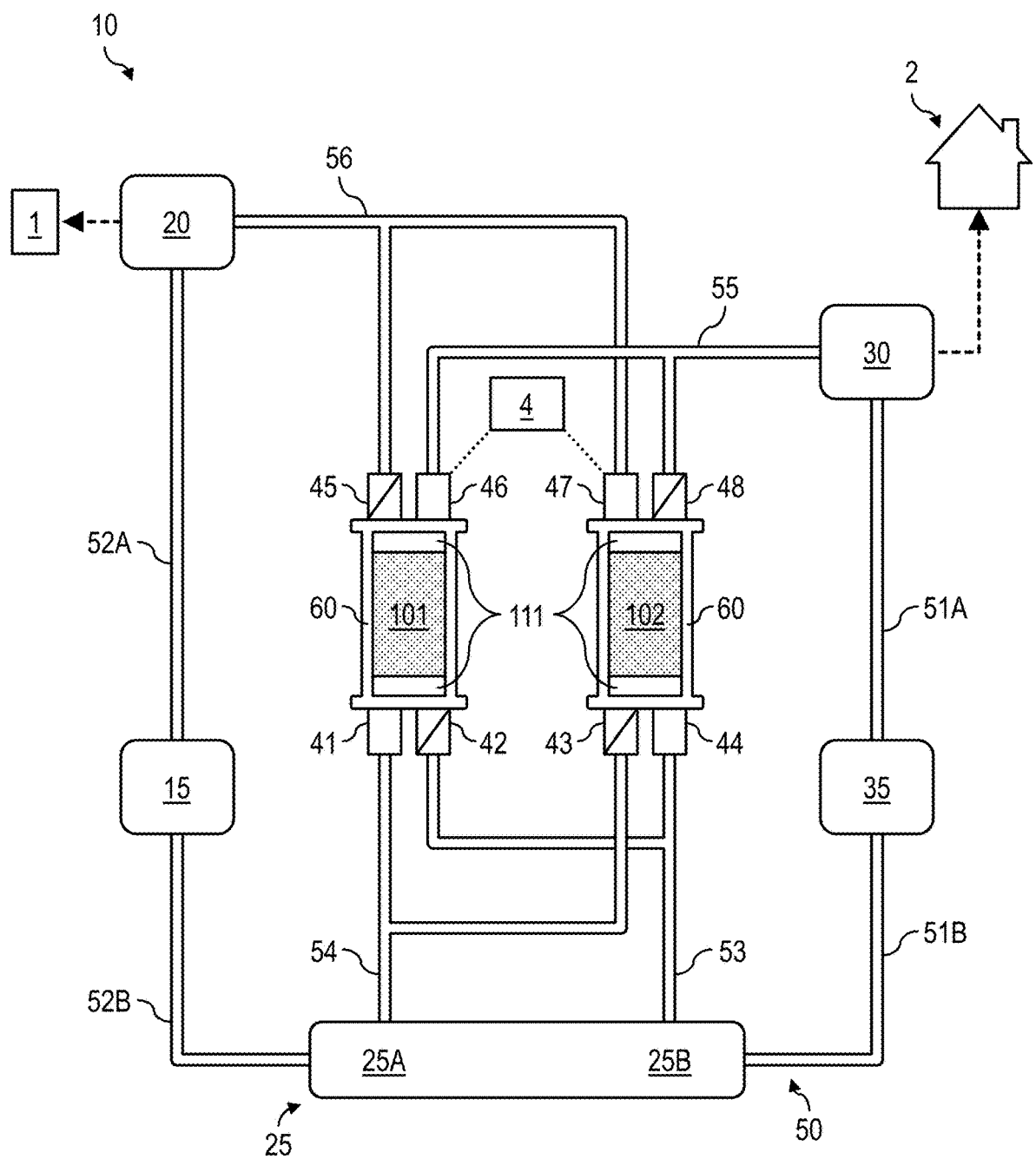
FIG. 4B is a schematic of the barocaloric heat transfer system of FIG. 4A in an alternate configuration.

According to some embodiments, as shown in FIGS. 4A-4B, a heat transfer system 10 may include more than one body (i.e., volume) of barocaloric material 101, 102. Each body of barocaloric material 101, 102 may be situated in a respective container 60 (or other suitable housing), and, as described previously, each body of barocaloric material 101, 102 may be provided in any suitable form including either particulate, porous, and/or solid body (i.e., bulk) form. In some embodiments, the containers 60 may include mixers or other internal structures to increase heat transfer between fluid passing through the container and the barocaloric material situated within the container. The heat transfer system 10 may also include a high pressure source, such as the depicted high pressure pump 15, which may pressurize and maintain the pressure of a high pressure fluid passing through the fluid connections 52A, 52B, and a low pressure source, such as the depicted low pressure pump 35, which may pressurize and maintain the pressure of a low pressure fluid passing through the fluid connections 51A, 51B. The high pressure fluid may be at a pressure that is greater than a pressure of the low pressure fluid. In some embodiments, the high pressure pump 15 may be a multi-stage pump, and the low pressure pump 35 may be a centrifugal pump, although other embodiments in which any appropriate type of pump is used for the high or low pressure pump are also contemplated. The heat transfer system 10 may further include the hot heat exchanger 20 and cold heat exchanger 30, described previously, which may thermally interact with environments 1 and 2.

While two containers 60 are shown in in FIGS. 4A-4B, it should be appreciated that any suitable number of containers (including barocaloric material either in solid or particulate form) may be used, including, but not limited to, one, two, three, four, five, ten, fifteen, twenty, twenty-five, fifty, one hundred, two hundred, three hundred or any suitable number, as the present disclosure is not so limited. In some embodiments, the containers 60 may be moveable with respect to other components of the heat transfer system. For example, the containers 60 may be bubbling bed reactors, such that the barocaloric material may move around in the container when pressurized by the heat transfer fluid(s).

The containers 60 may be connected to fluid connections 50 with a series of valves 41-48. In some embodiments, valves 41-48 may be electronically controlled valves that are electrically connected with a processor 4. The processor 4 may control operation of the valves 41-48 to selectively open and close the different sets of valves to cyclically control the flow of fluid through the different containers. Of course, while electronically controlled valves are depicted in the figure, mechanically actuated valves using a mechanical timing mechanism (e.g., coordinated transmissions, timing shafts, timing belts, etc.) may also be used as the disclosure is not so limited. It should also be appreciated that the processor 4 may also be configured to control any component (e.g., the pumps 15, 35 and heat exchangers 20, 25, 30) or combination of components of the heat transfer system 10 remotely or with any other mode of connection. The pumps 15, 35 and heat exchangers 20, 25, 30 may either be continuously operated or intermittently operated, for example with the processor 4.

It should be appreciated that any component of the heat transfer system, including containers 60, the fluid connections 50, and heat exchangers 20, 30 may be configured to withstand at least the entire temperature and pressure range of the fluid(s) passing through the system 10 and the rate of fast pressure changes within the system (e.g., pressurizing between 1 atm and 1000 atm in under a minute for many consecutive cycles). It should also be appreciated that the heat transfer system 10 may further include plumbing or routing components to decrease the likelihood of leaks and mechanical failure. For example, the system 10 may include sufficiently strong and/or compatible connections between neighboring components to prevent leakage, including, but not limited to, welds, flanges, seals, press-fits, or any other suitable connection. It should be appreciated that while continuous fluid connections 50 are shown in FIGS. 4A-4B, segmented or more complex pipe pathways may be contemplated, as the present disclosure is not so limited. For example, the heat transfer system 10 may include one or more manifolds used to control fluid flow. In some embodiments, the one or more manifolds may be controlled by the processor 4. The present disclosure is not limited by the properties of the mechanical and/or hydraulic components used therein.

The heat transfer system 10 depicted in FIGS. 4A and 4B may also include a heat exchanger 25, which may include a hot portion 25A, connected to fluid connection 51B, and a cold portion 25B, connected to fluid connection 52B. The heat exchanger 25 may modify the temperature of fluid (either high pressure fluid or low pressure fluid) flowing from the high/low pressure pumps 15, 35 to the containers 60. In some embodiments, the heat exchanger 25 may change the temperature of fluid flowing from fluid connection 52B to fluid connection 54 as well as the temperature of fluid flowing from fluid connection 51B to fluid connection 53, such that the fluid contained within fluid connection 53 and 54 are substantially similar in temperature. In other words, the heat exchanger 25 may equilibrate both the high and low pressure fluids at an intermediate temperature (e.g., room temperature or other appropriate operating temperature) prior to flowing through the barocaloric materials. In some embodiments, the heat exchanger 25 may be a shell-and-tube heat exchanger, although other embodiments of the heat exchanger are also contemplated. In some embodiments, the temperature of fluids in fluid connections 52B and 51B may be at a suitably intermediate temperature such that the heat transfer system 10 may not need a heat exchanger 25.

The heat transfer system 10 may include one or more filters 111 disposed between an internal volume of the associated container 60 in which the barocaloric materials are disposed and the connected fluid connections and valves 41-48. This may permit the barocaloric material to be retained in the internal volumes of the containers while permitting the fluid to flow past and/or through the barocaloric materials located in the containers during operation. while blocking particulate barocaloric material from flowing to the heat exchangers 20, 30. While filters located downstream of the inlet valves and upstream of the outlet valves are shown in FIGS. 4A-4B, it should be appreciated that the filters 111 may be located at any position along the fluid connections 50. In embodiments where the barocaloric material is a bulk body (e.g., a solid piece of material or a porous body), the heat transfer system 10 may not include filters, as the barocaloric material may not be able to flow past the valves.

The valves 41-48 shown in FIGS. 4A-4B may be controlled to pressurize or depressurize the containers 60 (and subsequently, the barocaloric material 101, 102) by transitioning between an open or closed state. FIG. 4A shows an embodiment of heat transfer system 10 where valves 41, 44, 46, and 47 are closed and valves 42, 43, 45, and 48 are open. The valves may be any suitable system to control fluid flow (i.e., hydraulic valves), including, but not limited to, rotary valves, ball valves, butterfly valves, check valves, needle valves, directional valves, relief valves, unloading valves, or any other suitable system, as the present disclosure is not so limited. In some embodiments, the valves include switches to turn on (i.e., open) a valve, which may be controlled by the processor 4. It should be appreciated that while distinct inlet (valves 41-44) and outlet (valves 45-48) valves in fluid communication with the associated containers 60 are shown in FIGS. 4A-4B, other embodiments of the valves are also contemplated, as the present disclosure is not limited by the location or number of valves. In some embodiments, the heat transfer system 10 may include nozzles in place of valves to control fluid flow.

In some embodiments, as shown in FIGS. 4A-4B, valves 42 and 44 may be high pressure inlet valves in fluid communication with the high pressure pump 35, and valves 41 and 43 may be low pressure inlet valves in fluid communication with the low pressure pump 15. Correspondingly, valves 45 and 47 may be high pressure outlet valves in fluid communication with the high pressure pump, and valves 46 and 48 may be low pressure outlet valves in fluid communication with the low pressure pump.

It should be understood that the different bodies of barocaloric material shown in FIGS. 4A-4B may either be operated in phase or out of phase with one another. For example, FIG. 4A shows a first barocaloric material 101 during the hot stage 3 of the heating cycle (see FIG. 2) and a second barocaloric material 102 during the cold stage 4 of the heating cycle (see FIG. 2) such that the two bodies of barocaloric material are cycled out of phase with one another. This may beneficially permit the continuous, or at least more continuous transfer of heat between the two environments. For example, the timing of the cycles of the two containers may be 180 degrees out of phase with one another. Accordingly, the high pressure valves (valves 42 and 45) of the first barocaloric material 101 may be open to connect the first barocaloric material 101 to the high pressure fluid connections 52A, 52B and 53, and the low pressure valves (valves 43 and 48) of the second barocaloric material 102 may be open to connect the second barocaloric material 102 to the low pressure fluid connections 51A, 51B, and 54.

In some embodiments, the first barocaloric material 101 may be pressurized by opening valve 42 to the high pressure fluid connections 53 and closing valve 45, which may compress and subsequently increase the temperature (i.e., heat) the first barocaloric material 101. Next, valve 45 may be opened to allow high pressure fluid at an intermediate temperature to flow through the first barocaloric material 101, past the valve 45, through the high pressure fluid connections 56 to the hot heat exchanger 20, which may dissipate the excess heat into the environment 1. The high pressure fluid stream of fluid connections 56 may have absorbed the heat of the barocaloric material 101 and may therefore be at a higher temperature than fluid contained with the fluid connections 54 or 53. As described previously, the heat exchanger 25 may work to equilibrate the temperature of fluid connections 53 and 54.

After a sufficient period of time in which the high pressure fluid flowing through the first barocaloric material 101 has reduced the temperature of the material back to an intermediate temperature (e.g., the temperature of fluid connections 53 and 54), valves 42 and 45 are closed (as shown in FIG. 4B) and valve 46 is opened. Fluid communication between the first barocaloric material 101 and the low pressure fluid connections 55 may depressurize or decompress the barocaloric material 101, which may in turn reduce the temperature of the barocaloric material below an intermediate temperature. Next, valve 41 may be open while valve 46 is open (as shown in FIG. 4B), to allow low pressure fluid at an intermediate temperature to flow through the cooled barocaloric material 101, which may cool the fluid below the temperature of fluid within the fluid connections 54. Cooled water flowing from valve 46 may subsequently flow to a cold heat exchanger through a low pressure fluid connections 55. As described previously, the cold heat exchanger may absorb heat (i.e., cool) from an environment 2. After sufficient heat transfer has taken place between the cooled barocaloric material 101 and the low pressure fluid, such that the barocaloric material 101 has heated back to the intermediate temperature, valves 41 and 46 may be closed, and valve 42 may be opened to resume the heat transfer cycle.

The barocaloric material 101 may be cooled/heated out of phase with the barocaloric material 102 such that while the first barocaloric material 101 may be heated (by being compressed), the second barocaloric material 102 may be cooled (by being decompressed). The inclusion of multiple containers 60 operating out of phase with one another may increase the efficiency of the cycle and increase the frequency at which cool fluid may be flowed to the environment 2 through the low pressure line 55. In some embodiments, this improvement in efficiency (due to multiple cascading containers 60 which may be at different points of the heat transfer cycle at any given time point) may result in a substantially continuous cooling of environment 2. For example, in one embodiment, the heat transfer system 10 may include three containers 60 including three barocaloric materials (each of which may be either in bulk or particulate form), the first of which is undergoing the hot stage 3 (see FIG. 2), the second of which is undergoing the cold stage 4, and the third of which is transitioning between the hot stage 3 and cold stage 4, all during the same period of time (i.e., simultaneously). While two discrete bodies of barocaloric material (located in containers 60) are shown in FIGS. 4A-4B, it should be appreciated that any suitable number of barocaloric material bodies (either in solid or particulate form) may be used, including, but not limited to, one, two, three, four, five, ten, fifteen, twenty, or any suitable number, as the present disclosure is not so limited.

While unique inlet and outlet valves are shown in FIGS. 4A-4B, it should be appreciated that some embodiments may include a single fluid flow valve connected to the fluid connections 53, 54, 55, and 56 and operated with an appropriate processor 4 or other type of control scheme. In other embodiments, each barocaloric material may include a single inlet valve, connected to fluid connections 53, 54, and a single outlet valve, connected to fluid connections 55, 56, both of which may be controlled with rotary valves. It should be appreciated that the present disclosure is not limited by the configuration or arrangement of piping and fluid flow control.

Figure 5A:
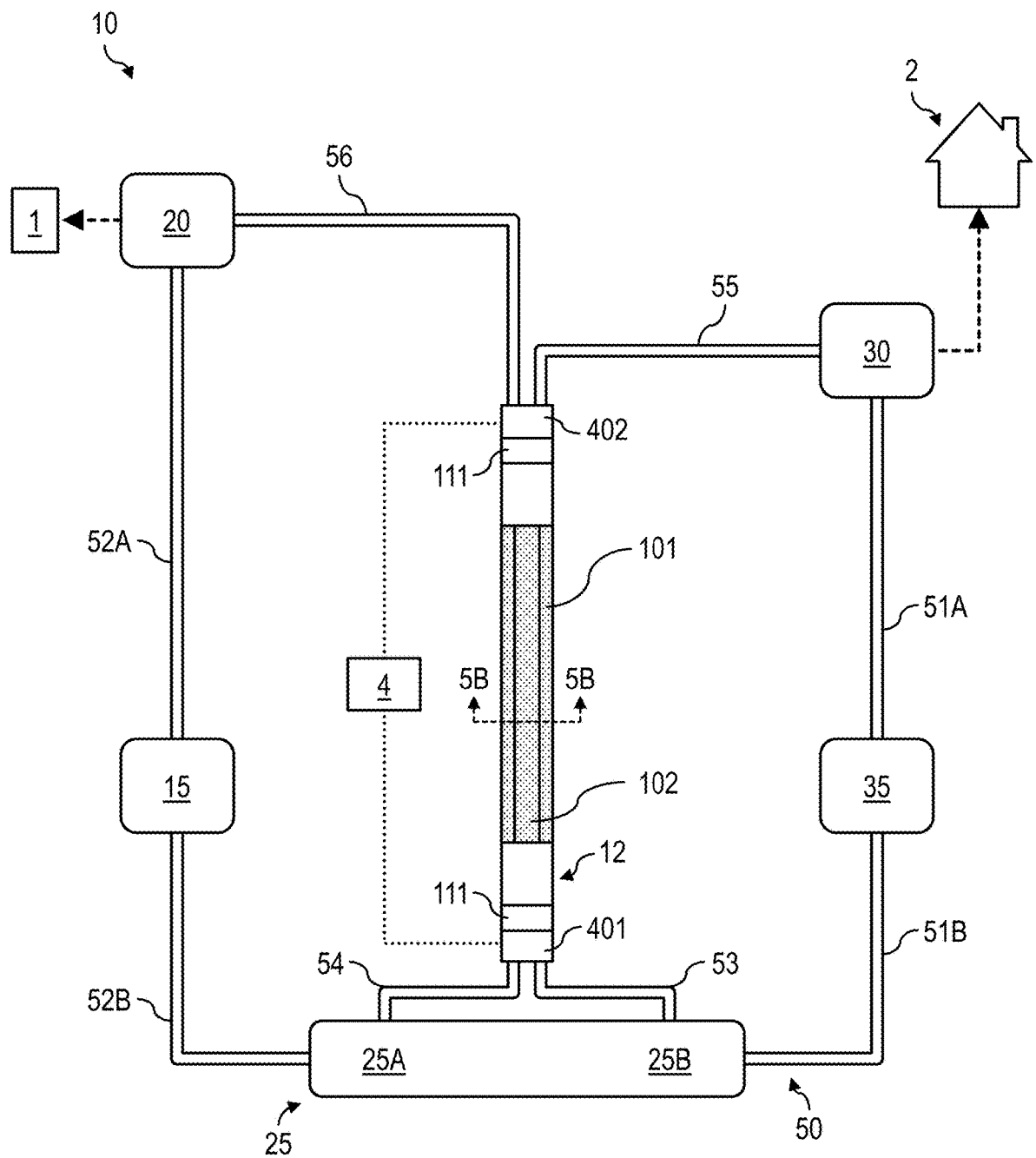
FIG. 5A is a schematic of yet another embodiment of a barocaloric heat transfer system.
Figure 5B:
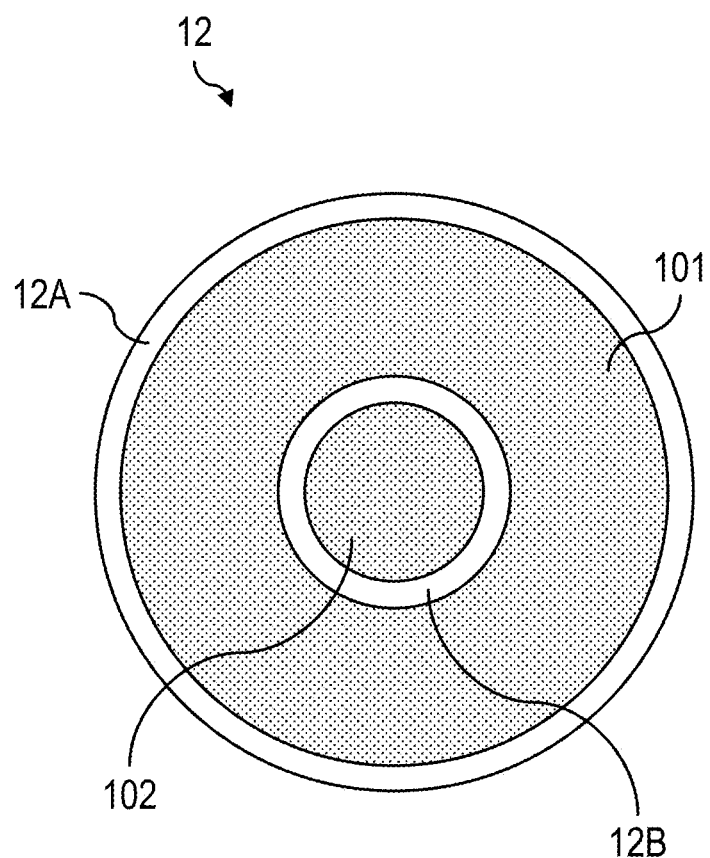
FIG. 5B is a cross-sectional view of the barocaloric heat transfer system of FIG. 5A taken along 5B-5B.

FIG. 5A shows a heat transfer system 10 according to some embodiments, including fluid connections 50, heat exchangers 20, 25, and 30, and pumps 15 and 35 similar to that described above. In the embodiments of FIG. 5A, the containers 60 of FIGS. 4A-4B may be replaced with a coaxial pipe 12, which may include a first barocaloric material stream 101 in an outer radial layer of the pipe 12 and a second barocaloric material stream 102 in an inner radial layer of the pipe 12. These barocaloric material streams may correspond to barocaloric material particles suspended within a heat transfer fluid that flows through each of the separate portions of the system. FIG. 5B shows a cross-section of the coaxial pipe 12 with an inner tube 12B and outer tube 12A taken along 5B-5B of FIG. 5B, with the two barocaloric materials 101, 102 situated in between.

It should be appreciated that barocaloric material streams flowing through any layer of the coaxial pipe 12 may be flowing in any suitable direction relative to streams in any other layer. In some embodiments, the barocaloric material streams may be flowing concurrently, such that each stream may be flowing in a similar direction. In these embodiments, each barocaloric material stream may be at a different stage of the heat transfer process. For example, barocaloric material 102 contained within an inner tube 12B of the coaxial pipe 12 may be at the hot stage 3 (see FIG. 2) while barocaloric material 101 contained within the outer tube 12A may be at the cold stage 4 (see FIG. 2). It should be appreciated that each barocaloric material stream may be at any suitable stage of the heat transfer process relative to any other barocaloric material stream, as the present disclosure is not so limited. In other embodiments, the barocaloric material streams may be flowing counter-currently, such that barocaloric material streams in different layers of the coaxial pipe 12 may be flowing in opposing directions. In these embodiments, the valves 401, 402 may be configured to modulate the appropriate flow direction, and the heat transfer system 10 may include additional fluid connections and/or additional hydraulic equipment to accommodate bi-directional flow within the heat transfer system. It should be appreciated that the current disclosure is not limited by the flow direction of any barocaloric material stream.

In some embodiments, the first barocaloric material stream 101 of FIG. 5B may be connected to a high pressure source while the second barocaloric material stream 102 may be connected to a low pressure source, with valves 401, 402 controlling pressurization and flow of each stream independently. In other words, inlet valve 401 and outlet valve 402 may be configured to control the two coaxial streams independently, such that each stream may be undergoing a different portion of the heat transfer cycle simultaneously. While the depicted embodiment illustrates rotary valves that may be rotated to a desired configuration to control the flow of fluid through each body of barocaloric material, it should be understood that any appropriate type of valving configuration (e.g., on-off valves, rotatory selector valves) may be used as the disclosure is not so limited. As described above, the barocaloric materials 101, 102 may be in either bulk or particulate form.

It should be appreciated that the coaxial pipe 12 may have other radial layers to sufficiently insulate the bodies of barocaloric materials from one another and/or to insulate from the environment of the heat transfer system 10. In other words, there may be insulating layers in between the barocaloric materials 101, 102 to prevent cooling or heating by conduction through the pipe 12. It should also be appreciated that the pipe may be formed of any material or combinations of materials to withstand the pressure and temperature ranges of the barocaloric material (and high/low pressure fluids) as well as the rapid rate at which pressure and temperature may be cycled. It should also be appreciated that the coaxial pipe 12 may withstand significant pressure differences between layers. In some embodiments, the coaxial pipe 12 may be able to withstand a first layer filled with a fluid connected to a low pressure source and a coaxial layer filled with a fluid connected to a high pressure source without significant warpage or buckling of any portion of the coaxial pipe 12. While a coaxial pipe 12 with two distinct bodies of barocaloric material is shown in FIG. 5B, it should be appreciated that the coaxial pipe 12 may contain any number of separate volumes as well as the associated valves and barocaloric material bodies as the disclosure is not limited to any particular number of volumes.

While inlet valve 401 and outlet valve 402 are shown upstream and downstream of the barocaloric material 101, 102 respectively in FIG. 5A, it should be appreciated that other embodiments of fluid flow control are contemplated. For example, the fluid connections 50 may also be a coaxial pipe, such that high pressure fluid (through lines 52A, 52B, 56) and low pressure fluid (through lines 51A, 51B, 55) both flow along the same line of fluid connections 50. In these embodiments, valves 401, 402 may also control the pressurization of the heat transfer fluid(s).

Figure 6A:
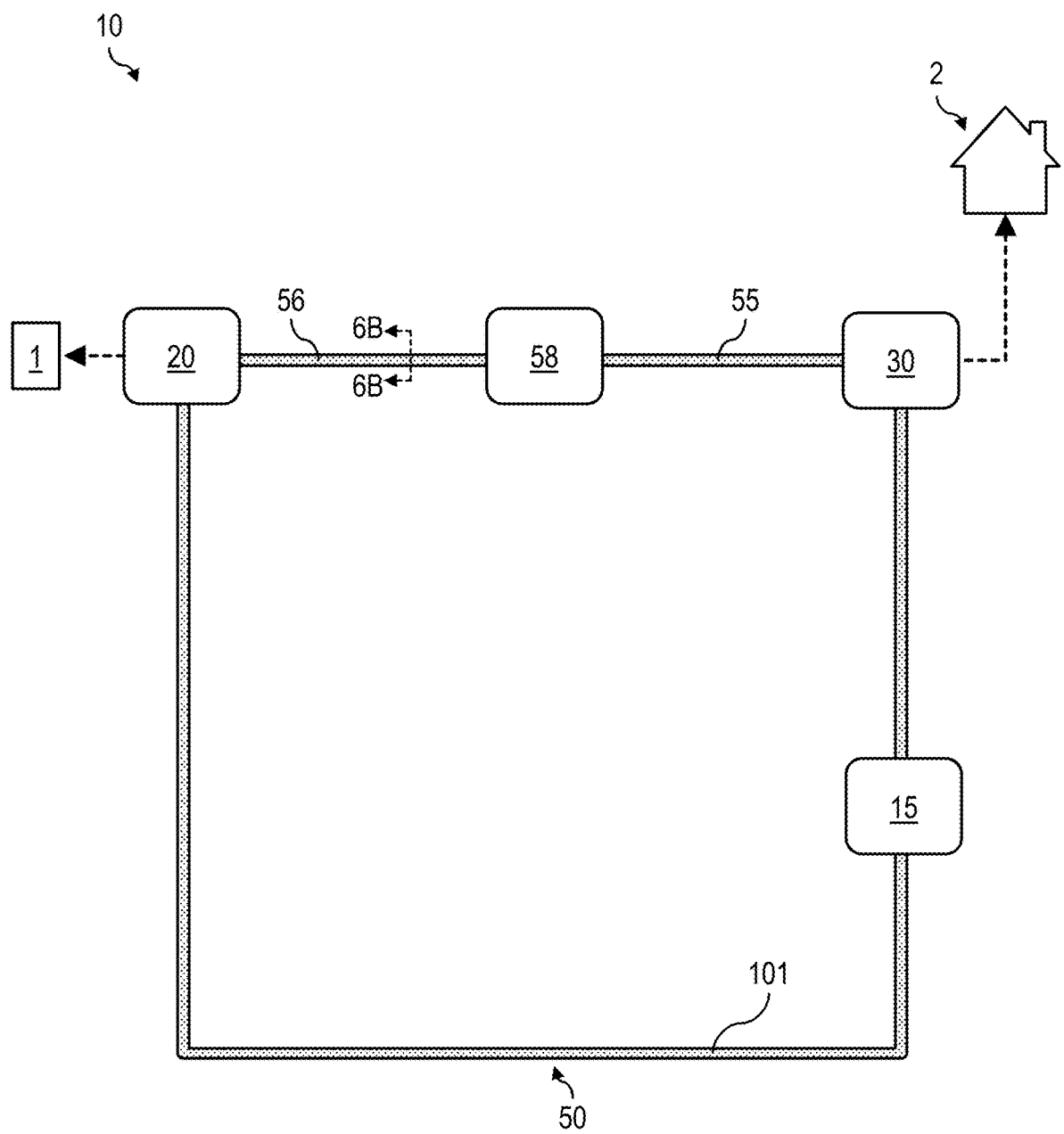
FIG. 6A is a schematic of yet another embodiment of a barocaloric heat transfer system.

FIG. 6A shows a heat transfer system 10 according to some embodiments, where the barocaloric material 101 may be in the form of particulates that are suspended in, and flow with, the heat transfer fluid throughout the various portions of the heat transfer system in a fluidized bed configuration. This may include flowing the heat transfer fluid and suspended barocaloric material particles through the various fluid connections 50, one or more pumps 15, as well as heat exchangers 20 and 30. In other words, the barocaloric materials 101, 102 may be pressurized along with the heat transfer fluid(s) flowing through the system 10. In some embodiments, a slurry of barocaloric material and heat transfer fluid(s) may flow through the system 10. In this way, a greater volume of barocaloric material may be used in the system 10 and the transfer of heat through from the barocaloric material to the heat transfer fluid may not be limited to an individual volume where the barocaloric material is maintained. Thus, such an embodiment may improve the efficiency of the heat transfer system by increasing the volume of barocaloric material involved. In some embodiments, flowing barocaloric material through the heat transfer fluids may also simplify the system 10 and may subsequently reduce the overall footprint and/or operational costs of the system. In this way, the heat transfer system 10 may be suitable for widespread use in a variety of applications and locales. In some embodiments, flowing the barocaloric material through the heat transfer system 10 may evenly distribute compressive stress along the plurality of barocaloric particles, which may improve the efficiency and/or lifetime of the barocaloric material.

Figure 6B:
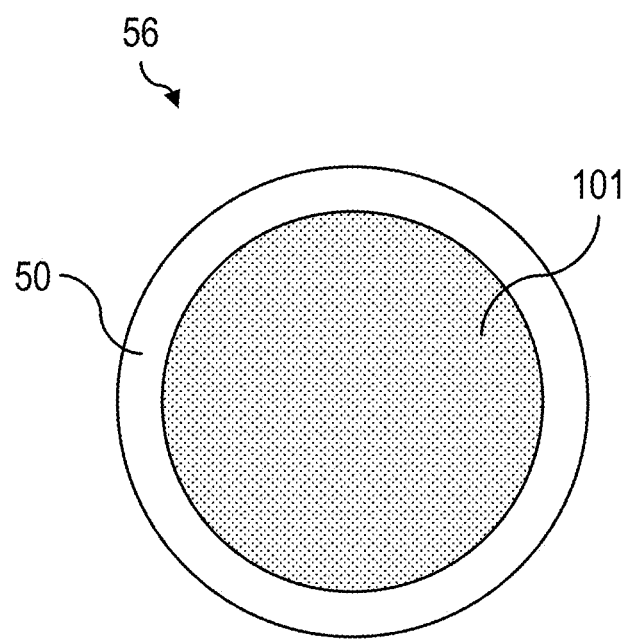
FIG. 6B is a cross-sectional view of the barocaloric heat transfer system of FIG. 6A taken along 6B-6B.

FIG. 6B shows a cross-section of a high pressure fluid connection 56, showing a fluid connection 50 (e.g., pipe) containing a barocaloric material 101 (or 102 or any other barocaloric material stream). It should be appreciated that the barocaloric material 101, 102 may be dispersed within the heat transfer fluid at any location along the system 10. In other words, a cross-section of any other line along fluid connection 50 (e.g., low pressure fluid connection 55) may also include barocaloric material. In embodiments where a barocaloric material flows throughout the system 10, suitable hydraulic controls (e.g., valves, nozzles, flow resections, etc.) may be used to pressurize and depressurize the fluid and/or barocaloric materials appropriately, such that there may be distinct and separated high pressure and low pressure lines running through the system 10 simultaneously. For example, as shown in the figure, the heat transfer fluid may flow from a high pressure pump 15 through the associated fluid connections 50 to a heat exchanger 20 under a first higher pressure. In some instances, these fluid connections may be referred to as the above-noted high pressure fluid connections 56. The hydraulic fluid and associated barocaloric material particles may then flow through one or more hydraulic controls 58 which may be configured reduce a pressure of the fluid to a second lower pressure in the low pressure fluid connections 55 prior to flowing through heat exchanger 30 to an inlet of the high pressure pump. The heat exchange processes during such a cycle may be similar to those described above. In such an embodiment, the particle size of the barocaloric material and a concentration of the barocaloric material in the fluid may be suitably selected to prevent blockage in the hydraulic equipment (heat exchangers and/or pumps) of the heat transfer system 10. In some embodiments, the hydraulic equipment may be suitably selected to accommodate the flow of barocaloric particles through the equipment. For example, piston pumps may be used to pressurize a fluid laden with barocaloric particles.

It should be appreciated that consolidation of the hydraulic components (e.g., piping or valves) of the heat transfer system 10 may reduce the overall footprint of the heat transfer system and may render the system more accessible and in some cases, more affordable. For example, using coaxial piping or rotary valves may improve the space efficiency of the heat transfer system. As described previously, the barocaloric system of the present disclosure is not limited by the arrangement or configuration of its hydraulic and/or mechanical infrastructure.

Exemplary System:

In one exemplary embodiment, a barocaloric material may include acetoxy silicone rubber particles with an average size of 1 mm, the high and low pressure fluids are both water, the high pressure fluid is pressurized at 1000 atm, and the low pressure fluid is pressurized at 1 atm (atmospheric pressure). In this embodiment, the barocaloric material undergoes a temperature difference of ±10° C., which cools the appropriate environment by 10° C., with a cycle time of approximately 30 seconds.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

Any terms as used herein related to shape, orientation, alignment, and/or geometric relationship of or between, for example, one or more articles, structures, forces, fields, flows, directions/trajectories, and/or subcomponents thereof and/or combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter.

The invention claimed is:

1. A heat transfer system comprising:
a barocaloric material;
a high pressure fluid source configured to pressurize the barocaloric material to q first pressure to heat a first flow of fluid; and
a low pressure fluid source configured to depressurize the barocaloric material to a second pressure to cool a second flow of fluid, wherein the second pressure is lower than the first pressure; and
a plurality of valves, wherein the plurality of valves are configured to flow the first flow of fluid from the high pressure fluid source to the barocaloric material in a first configuration in order to pressurize the barocaloric material to the first pressure; and wherein the plurality of valves are configured to flow the second flow of fluid from the low pressure fluid source to the barocaloric material in a second configuration to depressurize the barocaloric material to the second pressure.

2. The heat transfer system of claim 1, wherein the barocaloric material is formed of particles.

3. The heat transfer system of claim 1, wherein during operation the first flow of fluid and the second flow of fluid are in fluid communication.

4. The heat transfer system of claim 1, further comprising a hot heat exchanger and a cold heat exchanger, wherein during operation the first flow of fluid flows to the hot heat exchanger and the second flow of fluid flows to the cold heat exchanger.

5. The heat transfer system of claim 4, wherein the second heat exchanger is configured to absorb heat from an environment.

6. The heat transfer system of claim 1, wherein the barocaloric material is configured to flow through at least a first heat exchanger and a second heat exchanger.

7. A heat transfer system comprising:
at least one volume, wherein the at least one volume includes a first volume and a second volume, wherein the second volume is separate from the first volume wherein the first volume and the second volume are configured to be in fluid communication;
a barocaloric material disposed in the at least one volume;
a high pressure fluid source configured to supply a first fluid at a first pressure, wherein the high pressure fluid source is in selective fluid communication with the at least one volume;
a low pressure fluid source configured to supply a second fluid at a second pressure lower than the first pressure, wherein the low pressure fluid source is in selective fluid communication with the at least one volume, and wherein the high pressure fluid source and the low pressure fluid source are configured to alternatingly flow the first fluid and the second fluid through the at least one volume; and
a plurality of valves operatively associated with the first volume and the second volume, wherein the plurality of valves is configured to separately control a flow of the first fluid and a flow of the second fluid to both the first volume and the second volume.

8. The heat transfer system of claim 7, wherein the first fluid and the second fluid are the same fluid.

9. The heat transfer system of claim 7, further comprising a hot heat exchanger and a cold heat exchanger, wherein during operation the first fluid flows to the hot heat exchanger and the second fluid flows to the cold heat exchanger.

10. The heat transfer system of claim 9, wherein the barocaloric material is configured to flow through the hot heat exchanger and the cold heat exchanger.

11. The heat transfer system of claim 7, further comprising a coaxial pipe configures such that during operation, the first fluid flows through a first radial layer of the coaxial pipe and the second fluid flows through a second radial layer of the coaxial pipe.

12. A method of heat transfer using the heat transfer system of claim 7, the method comprising:
exposing the barocaloric material to the first fluid at the first pressure to heat the barocaloric material;
transferring heat from the barocaloric material to the first fluid to heat the first fluid to a first temperature;
exposing the barocaloric material to the second fluid at the second pressure that is less than the first pressure to cool the barocaloric material; and
transferring heat from the second fluid to the barocaloric material to cool the second fluid to a second temperature that is less than the first temperature.

13. The method of claim 12, wherein the barocaloric material is formed of particles.

14. The method of claim 12, further comprising flowing the first fluid to a hot heat exchanger.

15. The method of claim 12, further comprising flowing the second fluid to a cold heat exchanger.

16. The method of claim 15, further comprising absorbing heat from an environment by the cold heat exchanger.

17. The method of claim 12, further comprising flowing the barocaloric material through a first heat exchanger and a second heat exchanger.

* * * * *

UNITED STATES PATENT AND TRADEMARK OFFICE
CERTIFICATE OF CORRECTION

| | | |
|---|---|---|
| PATENT NO. | : 12,270,610 B2 | Page 1 of 1 |
| APPLICATION NO. | : 17/710612 | |
| DATED | : April 8, 2025 | |
| INVENTOR(S) | : Andrew Rohskopf et al. | |

It is certified that error appears in the above-identified patent and that said Letters Patent is hereby corrected as shown below:

In the Claims

In Claim 1, at Column 18, Line 40, the text: "material to q first pressure"
Should read: -- material to a first pressure --.

In Claim 1, at Column 18, Line 41, the text: "flow of fluid; and"
Should read: -- flow of fluid; --.

Signed and Sealed this
Thirteenth Day of May, 2025

Coke Morgan Stewart
*Acting Director of the United States Patent and Trademark Office*